United States Patent
Watterson et al.

(10) Patent No.: US 7,060,008 B2
(45) Date of Patent: Jun. 13, 2006

(54) METHODS FOR PROVIDING AN IMPROVED EXERCISE DEVICE WITH ACCESS TO MOTIVATIONAL PROGRAMMING OVER TELEPHONE COMMUNICATION CONNECTION LINES

(75) Inventors: Scott R. Watterson, Logan, UT (US); William T. Dalebout, North Logan, UT (US); Darren C. Ashby, Richmond, UT (US)

(73) Assignee: Icon IP, Inc., Logan, UT (US)

( * ) Notice: Subject to any disclaimer, the term of this patent is extended or adjusted under 35 U.S.C. 154(b) by 0 days.

(21) Appl. No.: 11/132,740

(22) Filed: May 18, 2005

(65) Prior Publication Data

US 2005/0215397 A1   Sep. 29, 2005

Related U.S. Application Data

(60) Division of application No. 10/106,842, filed on Mar. 26, 2002, now Pat. No. 6,918,858, which is a continuation-in-part of application No. 09/641,600, filed on Aug. 18, 2000, and a continuation-in-part of application No. 09/641,220, filed on Aug. 18, 2000, now Pat. No. 6,458,060, and a continuation-in-part of application No. 09/641,627, filed on Aug. 18, 2000, and a continuation-in-part of application No. 09/496,560, filed on Feb. 2, 2000, now Pat. No. 6,447,424, which is a continuation-in-part of application No. 09/349,608, filed on Jul. 8, 1999, now Pat. No. 6,312,363.

(51) Int. Cl.
*A63B 21/00* (2006.01)

(52) U.S. Cl. ............................ 482/54; 482/51; 482/8; 482/9; 482/900

(58) Field of Classification Search ................ 482/1–9, 482/51, 54, 900–902
See application file for complete search history.

(56) References Cited

U.S. PATENT DOCUMENTS

| | | | |
|---|---|---|---|
| 4,112,928 A | 9/1978 | Putsch | |
| 4,358,105 A | 11/1982 | Sweeney, Jr. | |
| 4,571,682 A | 2/1986 | Silverman et al. | |
| 4,642,769 A | 2/1987 | Petrofsky | |
| 4,708,337 A | 11/1987 | Shyu | |
| 4,842,274 A | 6/1989 | Oosthuizen et al. | |
| 4,860,763 A | 8/1989 | Schminke | |
| 4,934,694 A | 6/1990 | McIntosh | |
| 4,959,713 A | 9/1990 | Morotomi et al. | |
| 5,020,795 A | 6/1991 | Airy et al. | |
| 5,113,427 A | 5/1992 | Ryoichi et al. | |

(Continued)

*Primary Examiner*—Glenn E. Richman
(74) *Attorney, Agent, or Firm*—Workman Nydegger

(57) ABSTRACT

The present invention is directed to systems and methods for controlling an exercise device with one or more control signals associated with an exercise program received from a telephone answering service. The exercise device includes an input device through which a user can request an exercise program from the telephone answering service. The telephone answering service delivers selectable options to the exercise device, which presents the options to the user. In response to the user selecting a particular option, the telephone answering service delivers the selected exercise program, including one or more control signals, to the exercise device. The exercise device identifies the one or more control signals, either by detecting the audible representation of the one or more control signals or analyzing the electronic representation of the received exercise program, and controls one or more operating parameters of the exercise device based upon such one or more control signals.

20 Claims, 9 Drawing Sheets

U.S. PATENT DOCUMENTS

| | | |
|---|---|---|
| 5,387,164 A | 2/1995 | Brown, Jr. |
| 5,410,471 A | 4/1995 | Alyfuku et al. |
| 5,410,472 A | 4/1995 | Anderson |
| 5,462,051 A | 10/1995 | Oka et al. |
| 5,474,090 A | 12/1995 | Begun et al. |
| 5,489,249 A | 2/1996 | Brewer et al. |
| 5,535,664 A | 7/1996 | Rokowski |
| 5,619,412 A | 4/1997 | Hapka |
| 5,619,991 A | 4/1997 | Sloane |
| 5,645,509 A | 7/1997 | Brewer et al. |
| 5,702,323 A | 12/1997 | Poulton |
| 5,722,418 A | 3/1998 | Bro |
| 5,890,995 A | 4/1999 | Bobick et al. |
| 5,911,132 A | 6/1999 | Sloane |
| 5,911,687 A | 6/1999 | Sato et al. |
| 5,916,063 A | 6/1999 | Alessandri |
| 5,961,561 A | 10/1999 | Wakefield, II |
| 6,042,519 A | 3/2000 | Shea |
| 6,053,844 A | 4/2000 | Clem |
| 6,059,692 A * | 5/2000 | Hickman ................... 482/8 |
| 6,152,856 A | 11/2000 | Studor et al. |
| 6,312,363 B1 | 11/2001 | Watterson et al. |
| 6,458,060 B1 | 10/2002 | Watterson et al. |
| 6,464,618 B1 | 10/2002 | Shea |
| 6,475,115 B1 * | 11/2002 | Candito et al. ................ 482/4 |
| 6,497,638 B1 | 12/2002 | Shea |
| 6,601,016 B1 | 7/2003 | Brown et al. |
| 6,634,992 B1 * | 10/2003 | Ogawa ...................... 482/8 |
| 6,638,198 B1 | 10/2003 | Shea |

* cited by examiner

METHODS FOR PROVIDING AN IMPROVED EXERCISE DEVICE WITH ACCESS TO MOTIVATIONAL PROGRAMMING OVER TELEPHONE COMMUNICATION CONNECTION LINES

CROSS-REFERENCE TO RELATED APPLICATIONS

This application is a divisional application of U.S. patent application Ser. No. 10/106,842, filed Mar. 26, 2002, now U.S. Pat. No. 6,918,858 entitled "Systems and Methods For Providing an Improved Exercise Device with Access To Motivational Programming Over Telephone Communication Connection Lines", which is a continuation-in-part application of U.S. patent application Ser. No. 09/641,600, filed Aug. 18, 2000, entitled "Computer Systems and Methods for Interaction With Exercise Device," a continuation-in-part application of U.S. patent application Ser. No. 09/641,220, filed Aug. 18, 2000, now U.S. Pat. No. 6,458,060 entitled "Systems and Methods for Interaction With Exercise Device," and a continuation-in-part application of U.S. patent application Ser. No. 09/641,627, filed Aug. 18, 2000, entitled "System for Interaction With Exercise Device," each of which is a continuation-in-part application of U.S. patent application Ser. No. 09/349,608, filed Jul. 8, 1999, now U.S. Pat. No. 6,312,363 entitled "Systems and Methods for Providing an Improved Exercise Device With Motivational Programming" and a continuation-in-part application of U.S. patent application Ser. No. 09/496,560, filed Feb. 2, 2000, now U.S. Pat. No. 6,447,424 entitled "System and Method for Selective Adjustment of Exercise Apparatus," all of which are incorporated herein by reference.

BACKGROUND OF THE INVENTION

1. The Field of the Invention

This invention relates to providing exercise programming to exercise equipment. More specifically, the present invention relates to systems and methods for providing improved exercise devices that are capable of accessing remotely stored exercise programming, including motivational content and one or more control signals.

2. The Relevant Technology

In recent years, there has been a steady trend toward consumers becoming healthier and more physically conditioned. These consumers seek new and varied manners to exercise, whether alone or in a group setting. Many consumers purchase home exercise devices or equipment to enable the consumer to avoid the problems associated with exercising at a health club or gym, such as the high annual costs, the requirement to exercise at a location distant from the consumer's home, the difficulty of accessing particular types of exercise devices or equipment at certain times, or the like.

One common problem with home exercise equipment, however, is motivating the consumer to use the device or equipment on a consistent and ongoing basis. In addition, the exercises performed by a consumer using exercise devices or equipment, whether at home or at a health club or gym, involve repetitive actions, which can quickly become tedious and boring to a person exercising alone.

One of the primary disadvantages with group training, however, is that it is typically available only at health clubs and, therefore, is not as convenient as exercising in the privacy and comfort of one's own home. It would, therefore, be a definite advancement in the art of home exercise equipment to provide the desirable benefits of group exercise by providing motivational programming that simulates a group exercise setting in the home.

BRIEF SUMMARY OF THE INVENTION

The present invention is directed to systems and methods for providing exercise devices with motivational programming. Further, the present invention contemplates the use of programming that includes motivational content and one or more control signals, optionally synchronized with the motivational content, for controlling the operation of an exercise device. Additionally, embodiments of the present invention are particularly well suited to exercise devices that utilize one or more motors and/or other electrically driven actuators to control one or more operating parameters of the exercise device.

The exercise device can be configured to receive programming from a telephone answering service via a communication line connection. The communication line connection may be a plain old telephone system (POTS) connection or some other connection known to one skilled in the art. In one exemplary embodiment, the exercise device includes a connection mechanism, such as a communication connection button that enables the exercise device to establish a connection with the telephone answering service. Further, the exercise device includes a keypad that enables a user of the exercise device to select from available programming presented to the user. For instance, the telephone answering service presents the user with audible recitations of choices of available programming and the user can select particular programming by activating the buttons on the keypad. In addition, the keypad enables the user to respond to messages or requests for information, such as but not limited to, authentication credentials, payment information, exercise device types, exercise difficulty level, selection of programming, or the like. In one embodiment, the connection mechanism and keypad are combined into a telephone that is integrally formed with the exercise device.

The exercise device is configured to receive the programming, including the motivational content and/or the one or more control signals, and present the same to the user of the exercise device. In one embodiment, the audio portion of the programming is presented to the use through an audio output device, such as a speaker remote from the exercise device. Alternatively, the audio portion of the programming is presented to the user through an audio output device that is coupled to the exercise device, integrally formed with the exercise device, or the like. For instance, the audio output device can be connected to a telephone coupled to the exercise device, integrally formed with the exercise device, or the like.

In addition, the exercise device is configured to decode the control signals and cause a change in one or more measurable parameters of the exercise device. For instance, the control signals can cause a change in the speed or inclination of a moveable element of the exercise device, such as a tread base of a treadmill, the resistance associated with a wheel or crank of an exercise bicycle, or the like.

By providing access to a telephone answering service over a communication line connection, the present invention improves a user's exercise experience. Providing access to a store of exercise programming over a communication line connection allows a user to access more content at less cost than would be available to the user if the programming were stored on the exercise device. The present invention improves the chances that a user will have access to exercise programming that appeals most to his or her tastes and style. The programming available through the telephone answering service may be augmented or modified periodically, allowing users to have access to a more varied exercise regime. Furthermore, a user of the present invention is able to select a complex exercise program without knowing the individual commands for invoking the corresponding modes of operation on the exercise device. The use of these features allows a user of the exercise device to increase his motivational level and experience greater enjoyment of his or her exercise regime.

These and other novel features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
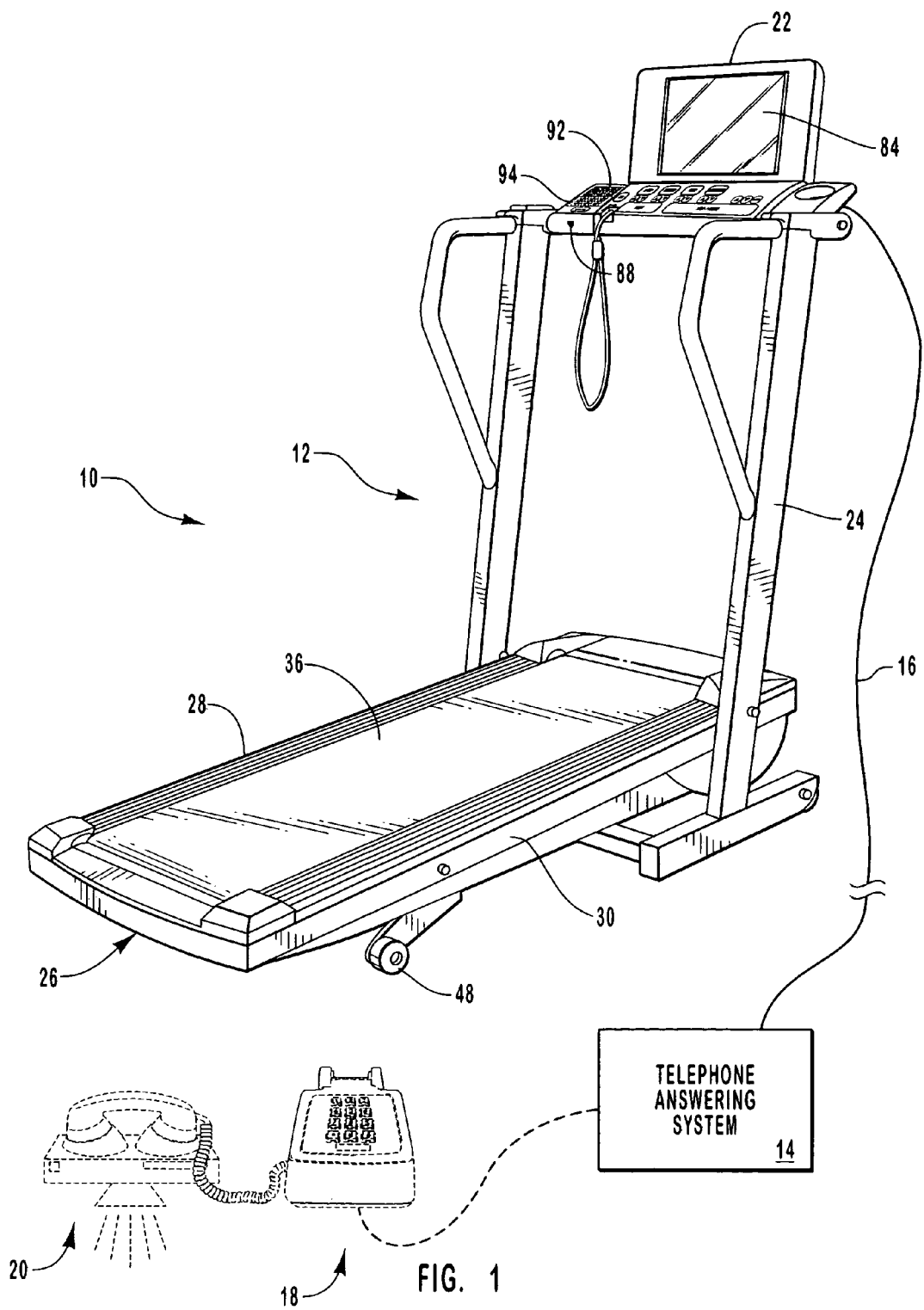
FIG. 1 is an illustration of an exercise system in accordance with the teaching of the present invention.

The present invention is directed to devices, systems, and methods for facilitating delivery of programming to an exercise device using a communication infrastructure, such as the infrastructure associated with a telephone network. Additionally, the present invention is directed to devices, systems, and methods that enable a user to obtain programming, including motivational content and/or one or more control signals through an interface incorporated within an exercise device. Further, the present invention relates to devices, systems, and methods for using an audible prompt and response dialog to facilitate selecting available programming from programming stored at a data store associated with a telephone answering service.

In embodiments of the present invention, programming optionally contains both motivational content and one or more control signals. The control signals are optionally synchronized with the motivational content and are designed to control one or more operating parameters of the exercise device in synchronization with the motivational content of the programming. Although reference is made to the motivational content being synchronized with the control signals, one skilled in the art can appreciate that the motivational content need not be synchronized. Further, the programming can include only one or more control signals without motivational content or only motivational content without one or more control signals.

As used herein, the term "motivational content" is used to broadly refer to any audio material, including dialog, narration, sound effects and/or music, either alone or in combination with video material. The motivational content can include music, voice-overs by a trainer that are designed to instruct and encourage the user of an exercise device, combinations thereof, or the like. The tone and tempo of the dialog and/or the background music is optionally selected to match the intensity of the workout defined by the one or more control signals. While the foregoing selections are provided by way of example, it should be understood that various other selections of the particular audio and video materials used to motivate and inspire the user of an exercise device can be made by the producer of the programming.

When the exercise device is a treadmill, the one or more control signals can control the speed of the belt associated with the treadmill, the inclination and/or declination of the associated tread base, or the like. Similarly, when the exercise device is a stationary bicycle, the one or more control signals control the resistance applied against the movement induced by the exerciser, or the like. Various operating parameters are known to those skilled in the art in light of the teaching contained herein and the particular exercise device used with an embodiment of the present invention.

In one embodiment, the control signals are carried on a 2 kHz carrier signal, with each control signal including two transmission bursts, each burst having three bytes of data. The second burst is intended to exactly duplicate the first burst for error checking purposes. In the case where the exercise device is a treadmill, the first byte of data of each burst indicates the desired speed of the treadmill, the second byte of data indicates the desired inclination of the tread base, and the third byte is a checksum of the first and second bytes. Each control signal, including both bursts, is typically less than one-quarter second in duration. Illustratively, each byte includes 8 bits of data, giving a high degree of resolution for controlling treadmill speed and the degree of inclination. In one embodiment, each time a control signal is inserted into the programming, the control signal entirely suppresses the audio portion of the motivational content for the duration of the control signal. As a result, the control signals are audible to the user, which also provides an audible cue or warning to the user that one or more operating parameters of the exercise device is about to change. In another configuration, the control signal is inaudible. In still another configuration, the control signal is inaudible, while the exercise device includes another mechanism to indicated to the user of a change in one or more operating parameters of the exercise device, such as but not limited to, blinking lights, displayed liquid crystal display (LCD) message, tactile notification, audible music and/or digitized voice that indicates a change, combinations thereof, or the like.

The presently described format and method for encoding the one or more control signals is representative only and is not intended to limit the scope of this invention. Any number of encoding schemes, which are known to those skilled in the art, could be used and are encompassed within the scope of the present invention. For example, the control signal can be carried in a carrier signal having a frequency between about 20 Hz and about 20 kHz, and more preferably between about 1 kHz and about 4 kHz, and more preferably about 2 kHz. Similarly, although reference is made to using the transmission bursts, each burst having three bytes of data, other embodiments of the present invention can include one or more bursts with one or more bytes. Further, each byte can include any number of bits so long as the control signals are understandable by the exercise device receiving the same.

Reference is now made to FIG. 1 that illustrates an exemplary system of the present invention. As illustrated, a system 10 includes an exercise device 12, such as a treadmill and an automated telephone answering service 14 remote from exercise device 12. Although reference is made to embodiments of the present invention with a treadmill as exercise device 12, it can be understood and appreciated by one skilled in the art in light of the teaching contained herein that embodiments of the present invention can be embodied in various other exercise devices, such as but not limited to, any motorized exercise device or any other exercise device that utilizes stepper motors, solenoids or any other electrically driven actuator to control any operating parameter of the device, such as speed, resistance, inclination or other similar operating parameters. Consequently, the term "exercise device" shall refer broadly to any type of exercise machine, including, but not limited to, treadmills, exercise cycles, Nordic style ski exercise devices, rowers, steppers, and elliptical or striding exercise devices.

The exercise device 12 communicates with telephone answering service 14 through a communication line connection 16, such as but not limited to, a telephone line, a cable line, a wireless connection, an infra-red connection, satellite connection, or the like. The telephone answering service 14 delivers requests for information from exercise device 12 and the user of exercise device 12 following the creation of a connection between telephone answering service 14 and exercise device 12 and the ensuring of the integrity of such a connection through one or more handshaking protocols that are known to those skilled in the art. For example, exercise device 12 and telephone answering service 14 establish a connection therebetween through one or more input devices coupled to exercise device 12, such as but not limited to an integrally formed telephone, or through a conventional telephone 18 and associated audio output device 20 separate from exercise device 12 while communicating therewith.

Upon verifying the integrity of the connection by system 10, telephone answering service 14 transmits audio prompts associated with available menu options across the connection to exercise device 12; such options being presented to the exerciser using exercise device 12. These prompts can invite the user to respond to or answer the prompt by providing relevant information relating to the user's identity, the exercise device model being used, exercise program selected, username and password, payment information, or the like.

The information requested from the user and received by telephone answering service 14 may be used to tailor future options that are to be presented to the user, such as options based upon the user's skill or experience level, options based upon the capabilities of the exercise device being used, or the like. Further, this information may be used to ensure that the user is authorized to access the store of exercise programming and/or facilitate telephone answering service 14 in recalling past exercise programs that have been requested by the user. Such information can be considered as user preferences. One skilled in the art will recognize that other information can be gleaned from various different requests or options presented to the user are possible, and the present invention is not limited by the preceding non-exclusive listing.

In addition to the above, telephone answering service 14 is configured to deliver programming to exercise device 12 when telephone answering service 14 has received the appropriate information. For instance, upon exercise device 12 transmitting responses entered by the user to the requests made by telephone answering service 14, telephone answering service 14 transmits either one or more follow-up audio prompts, or, if all appropriate prompts have been answered, transmits an audio prompt inviting the user to select particular programming. Consequently, telephone answering service 14 delivers the requested programming, including motivational content and/or one or more control signals to exercise device 12.

The prompts, options, follow-up prompts, programming, or the like can be delivered directly to exercise device 12. Alternatively, telephone answering service 14 can deliver the prompts, options, follow-up prompts, programming, or the like to a conventional telephone 18 and/or an output device 20, such as a remote speaker, as illustrated in dotted lines. The output device 20 presents its prompts, options, follow-up prompts, programming, or the like to the user, while exercise device 12 detects the audible recitation of the prompts, options, follow-up prompts, programming, or the like and changes one or more operating parameters of the exercise device 12.

The combination of telephone 18 and output device 20 enables a user to utilize existing telephone equipment to receive prompts, options, follow-up prompts, programming, or the like, thereby reducing the costs associated with exercising.

As shown in FIG. 1, treadmill 12 includes a control panel 22 supported on a generally upright support structure 24 and a tread base 26. The upright support structure 24 is configured to support control panel 22 and tread base 26. Consequently, upright support structure 24 can have various configurations and may be fabricated from various materials so long as upright support structure 24 is capable of supporting control panel 22 and tread base 26. For example, the elements of upright support structure 24 can be fabricated from metals, plastics, natural materials, composites, combinations thereof, and the like.

The tread base 26 can be placed in one of a variety of positions. For example, FIG. 1 illustrates tread base 26 in a downward position that allows an individual to exercise thereon. While in the downward position, tread base 26 can be selectively angled with respect to the surface upon which treadmill 12 rests to provide further resistance to the individual exercising thereupon. Although discussion is made herein to an exercise device that includes a tread base that can be placed in one of a variety of position, it can be understood that the exercise device can include a tread base that is fixed in a downward position.

Figure 2:
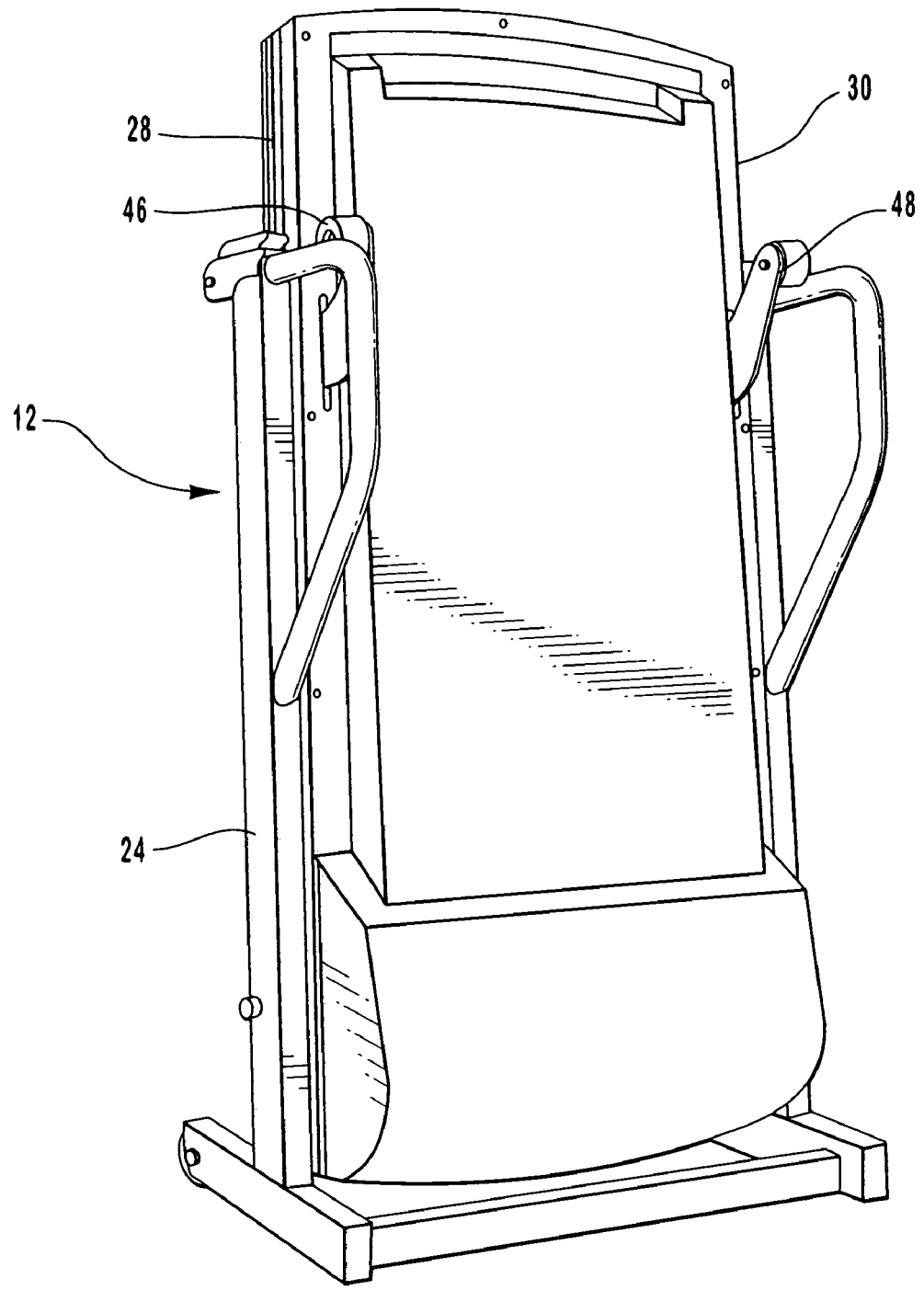
FIG. 2 is a perspective illustration of a reorienting treadmill, with the tread base positioned in a storage position, usable in the exercise system of FIG. 1.
Figure 3:
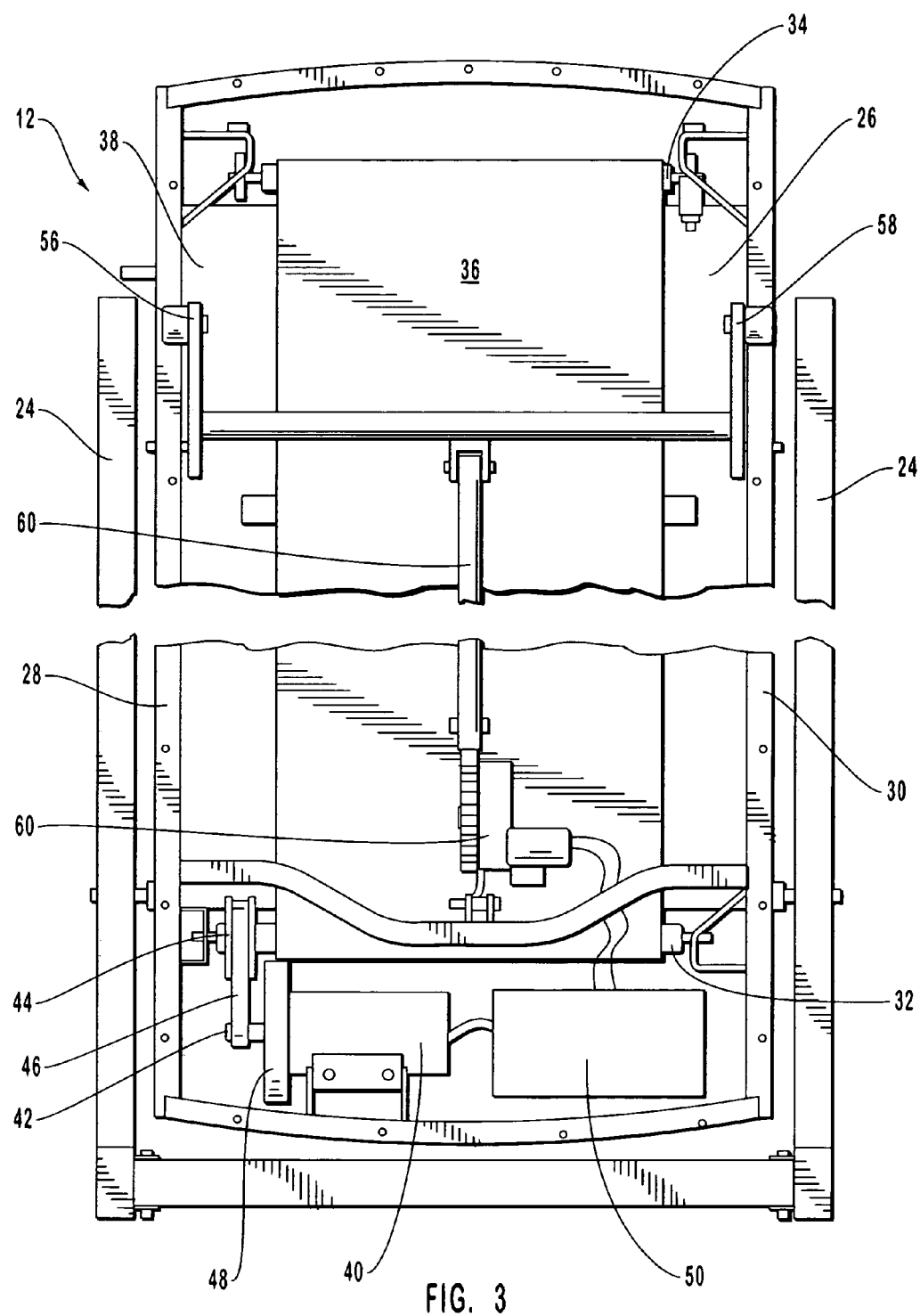
FIG. 3 is a partial plan view of portions of the reorienting treadmill, usable in the exercise system of FIG. 1, with the treadmill oriented in the storage position and with the bottom cover removed, revealing some of the internal components of the treadmill.

As illustrated in FIGS. 2 and 3, tread base 26 can be placed in an upward position for storage. To aid with the description of treadmill 12, FIG. 3 illustrates a partial view of portions of treadmill 12 with tread base 26 in an upward position and with a bottom cover of FIG. 2 removed so as to reveal some of the internal components of treadmill 12.

With reference to FIG. 3, tread base 26 includes a pair of side rails 28 and 30 with a front pulley 32 and a rear pulley 34 disposed between and supported by side rails 28 and 30. Extending between front pulley 32 and rear pulley 34 is a continuous belt 36. Belt 36 is an example of a movable element that enables the performance of an exercise by a user when the exercise device is a treadmill. Pulleys 32, 34 and belt 36 may have various configurations and may be fabricated from various materials, as known by one skilled in the art.

A deck 38 supports the upper run of belt 36 and supports an exercising individual exercising thereupon; the individual is not shown. Deck 38 is fabricated from various types of materials that allow deck 38 to support belt 36 and a user exercising thereon. For instance, deck 38 can be fabricated from wood, plastics, metals, natural materials, composite materials, combinations thereof, and the like.

With continued reference to FIG. 3, front pulley 32 is mechanically coupled to an electric tread drive motor 40 by way of pulleys 42 and 44 and a drive belt 46. Motor 40 incorporates an inertial flywheel 48 that controls for fluctuations in the rotational motion of a shaft of motor 40 during operation of treadmill 12. Motor 40 is optionally electrically coupled to a treadmill controller 50 that controls the operation of motor 40 and the speed of belt 36 in response to various inputs or other control signals. As shown, treadmill controller 50 is incorporated within tread base 26, however one skilled in the art can appreciate that treadmill controller 50 may be incorporated within control panel 22.

Figure 4:
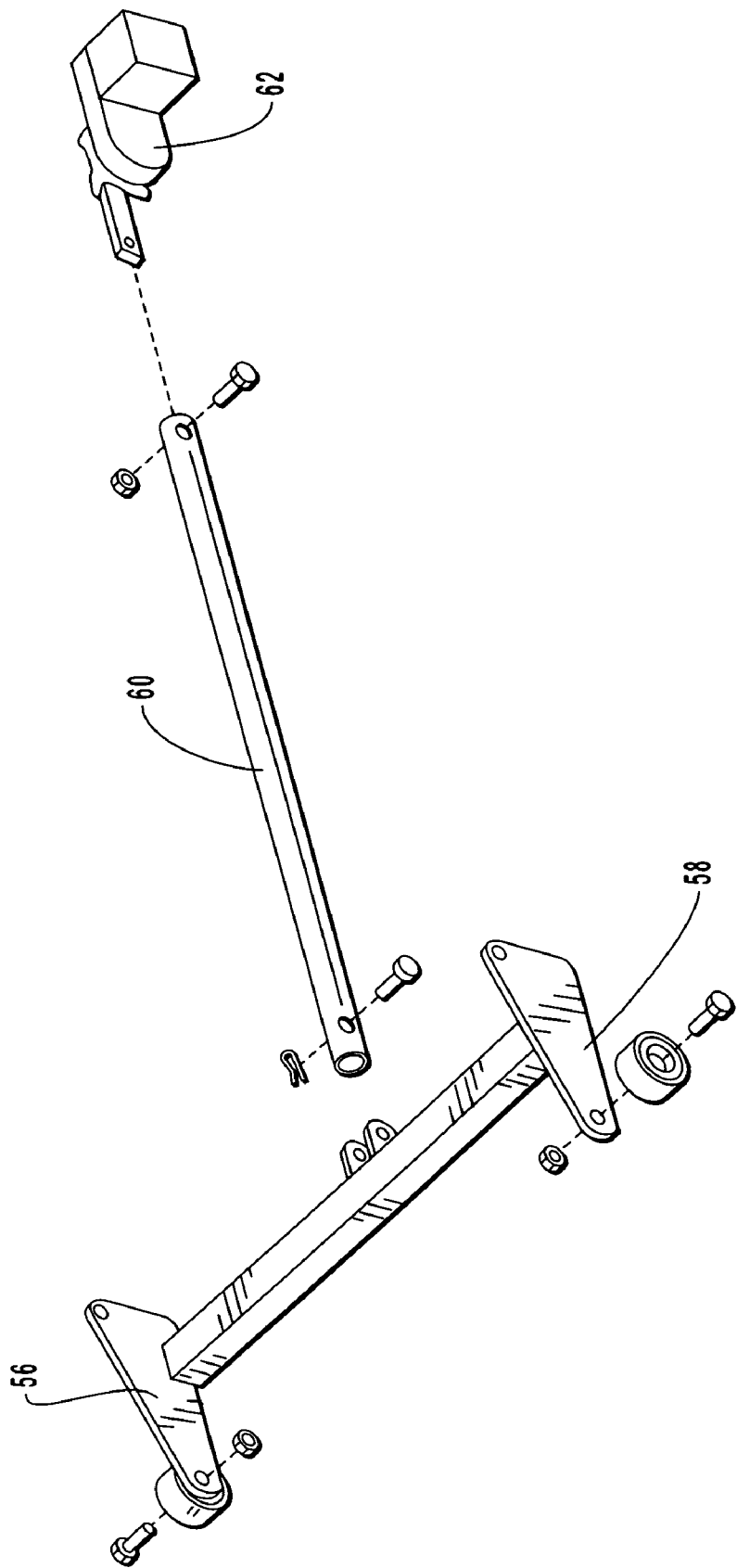
FIG. 4 is a partial exploded perspective view of the inclination mechanism incorporated into the treadmill illustrated in FIGS. 1 through 3 of the exercise system of FIG. 1.

In addition to the ability to control and vary the speed of belt 26, treadmill 12 permits the degree of inclination of tread base 26 relative to the floor to be varied. Typically, this is accomplished using an inclination drive motor that raises or lowers one end of tread base 26 relative to the other end. In the embodiment illustrated in FIGS. 1 through 4, a pair of rear feet 56 and 58 are rotatably attached to the rear of portion of side rails 28 and 30. As best seen in FIGS. 3 and 4, feet 56 and 58 are also mechanically coupled through a shaft 60 to an inclination drive motor 62, which causes feet 56 and 58 to pivot about their points of pivotal attachment to side rails 28 and 30, thereby selectively raising or lowering the rear end of tread base 26 relative to the front end thereof. Motor 62 is also electrically coupled to, and controlled by the treadmill controller 50, either in response to direct user input through the input devices 52 located on control panel 22 or to programming stored in nonvolatile memory incorporated into treadmill controller 50.

Figure 5:
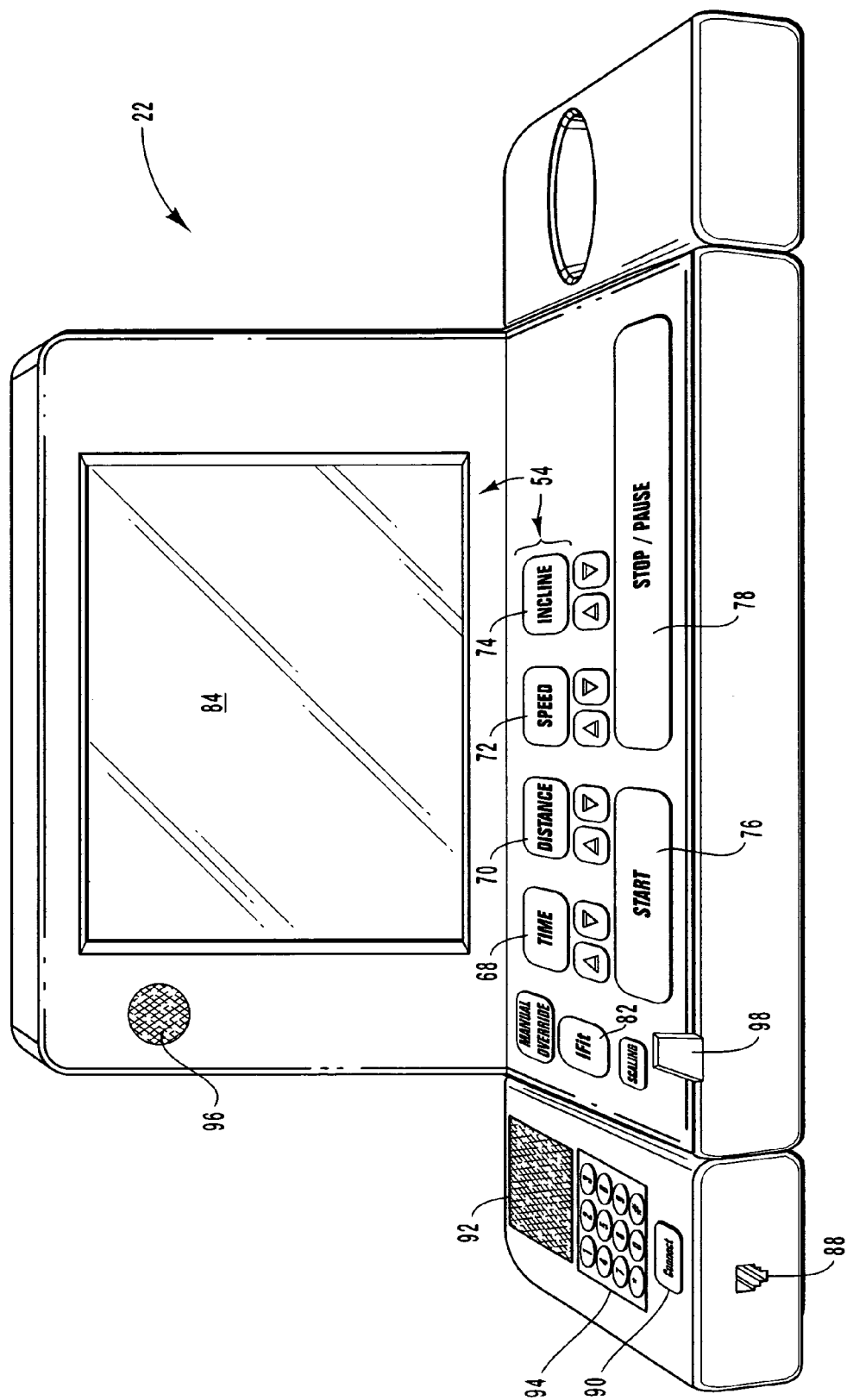
FIG. 5 is a perspective illustration of a control panel of the reorienting treadmill usable in the exercise system of FIG. 1.

Reference is now made to FIG. 5, which is a perspective illustration of an exemplary control panel 22 of exercise device 12 of FIG. 1. The operation of exercise device 12, and thus the speed of belt 26, and inclination or declination of tread base 26 when exercise device 12 is a treadmill, is controlled in response to direct inputs by the user through various input devices 52 (e.g., switches, rheostats, etc.) located on control panel 22 or in response to programming stored in memory incorporated within exercise device 12, such as in control panel 22 and/or tread base 26. Visual indicators relating to the operational status of exercise device 12, such as speed, inclination, resistance, duration of the work out, etc., are provided to the user through one or more output devices 54 located on control panel 22. Typical output devices 54 include light emitting diode (LED) displays, liquid crystal displays (LCD), cathode ray tube display (CRT), combinations thereof, or the like.

More specifically, control panel 22 can include a time output 68, a distance output 70, a speed output 72, and an incline output 74, each having an associated input key, buttons, or the like for defining values associated with time, distance, speed, and/or incline operating parameters of exercise device 12. Control panel 22 also includes a start button 76 and a stop/pause button 78 that provide the typical functionality to an exercise device, i.e., by depressing respective buttons an exerciser can start exercise device 12 and stop or pause the operation of exercise device 12.

In addition to the above, control panel 22 optionally includes an iFit button 82 that enables an exerciser to connect exercise device 12 to other exercise devices, a communication system, and/or computers, as discussed in detail in co-pending U.S. patent application Ser. Nos. 09/641,600, 09/641,220, and 09/641,627, the disclosures of which are incorporated herein by reference. Further, control panel 22 can include a manual override button, a scaling button, a diagnostic button, an audio input, a video input, an integrally formed mouse, game ports, or the like as referenced and discussed in the above-referenced co-pending patent applications.

In addition to the output devices thus discussed, control panel 22 includes a display 84 that can display programming, values of operating parameters of exercise device 12, or the like. For instance, display 84 can be a liquid crystal display (LCD), a light emitting diode (LED) display, an electroluminescent display (ELD), a gas-plasma display, a thin film transistor (TFT) display, a virtual reality (VR) display, a digital display, a cathode ray tube display, and the like.

To enable exercise device 12 to communicate with telephone answering service 14 (FIG. 1), control panel 22 includes a communication interface 88 and a communication connection button 90. The communication interface 88 is configured to accommodate the particular transmission medium used to facilitated communication between exercise device 12 and telephone answering device 14. For instance, in the illustrative example, communication interface 88 is an RJ-type port. Although depicted as an RJ-type port, it can be appreciated by one skilled in the art that communication interface 88 can be a serial port, a Universal Serial Bus (USB) port, a parallel port, a wireless port, or the like, depending upon the particular communication line connection used to connect the exercise device to the telephone answering service. For instance, the communication line connection can utilize one or more of conventional telephone lines, fiber optic lines, serial lines, parallel lines, USB lines wireless communication connection, or the like to communicate data and information between the exercise device, and/or the conventional telephone and audio output device, and the telephone answering service.

By activating communication connection button 90, exercise device 12 is automatically connected to telephone answering service 14. For instance, upon depressing communication connection button 90, exercise device 12 automatically dials a telephone number stored within a memory 116 (FIGS. 7 and 8) of exercise device 12 that is associated with the telephone answering service 14. In this way, an exerciser of exercise device 12 obtains one-touch access to telephone answering service 14 and the stored programming, including motivational content and/or one or more control signals. Although reference is made to activating or pressing a button, one skilled in the art can identify various other manners to initiate automatic dialing of a telephone number. For instance, in another embodiment, upon starting exercise device 12, the telephone number associated with the telephone answering services is automatically dialed. In another configuration, the telephone number is dialed in response to a voice command given by the user to dial the number. In still another configuration, the user dials the telephone number.

To enable an exerciser to respond to prompts initiated by telephone answering service 14 and optionally dial telephone answering service 14, exercise device 12 includes speaker 92 and keypad 94, each of which is respectively an output device and an input device. Speaker 92 can deliver audio recitations of available menu options and programming to the exerciser. Further, speaker 92 can deliver requests for data indicative of access credentials, such as user names and passwords, type of exercise device, exercise difficulty level, or the like. This requested data is input through keypad 94. Additionally, keypad 94 can be used to select menu items and/or programming from those referenced by telephone answering service 14.

Once a user selects particular programming, including the motivational content and/or one or more control signals, telephone answering service 14 delivers the programming to exercise device 12. The programming is delivered through communication interface 88 and subsequently presented to the exerciser through speaker 92 and/or display 84, depending upon the particular format of the programming. For instance, when programming includes video based motivational content, communication interface 84 is adapted to receive such content and initiate the display of the same on display 84 or a display separate from exercise device 12, while the audio portion of the programming is presented to the user via speaker 92.

Various other configurations of control panel 22 are known to those skilled in the art in light of the teachings contained herein. For instance, control panel 22 can include a microphone 96, as illustrated by dotted lines, to detect audio recitations of control signals. Further, control panel 22 can store user preferences defined by the user before or after connecting with telephone answering service 14, during request and response type prompts between the user and telephone answering service 14, combinations thereof, or the like. Further, the user can define specific preferences, such as preferred user credential, exercise device type, exercise program difficulty, exercise program length, or the like before connecting to telephone answering service 14. When the user selects button 90 to connect to telephone answering service 14, control panel 22 and/or one or more internal components, processors, and/or interfaces thereof, automatically deliver the user preferences to telephone answering service 14. This results in telephone answering service 14 automatically retrieving an exercise program that matches the preferences or is substantially close to the preferences and delivering the exercise program to exercise device 12. Therefore, through depressing button 90, the user can automatically request and receive the exercise program.

In another configuration, the control panel 22 includes a telephone that is integrally formed with control panel 22, the telephone performing one or more functions of the communication interface, the communication connection button, the keypad, and the speaker. The telephone further being adapted to interface with the other portions of the control panel and the exercise device as does the communication interface, the communication connection button, the keypad, and the speaker.

Figure 6:
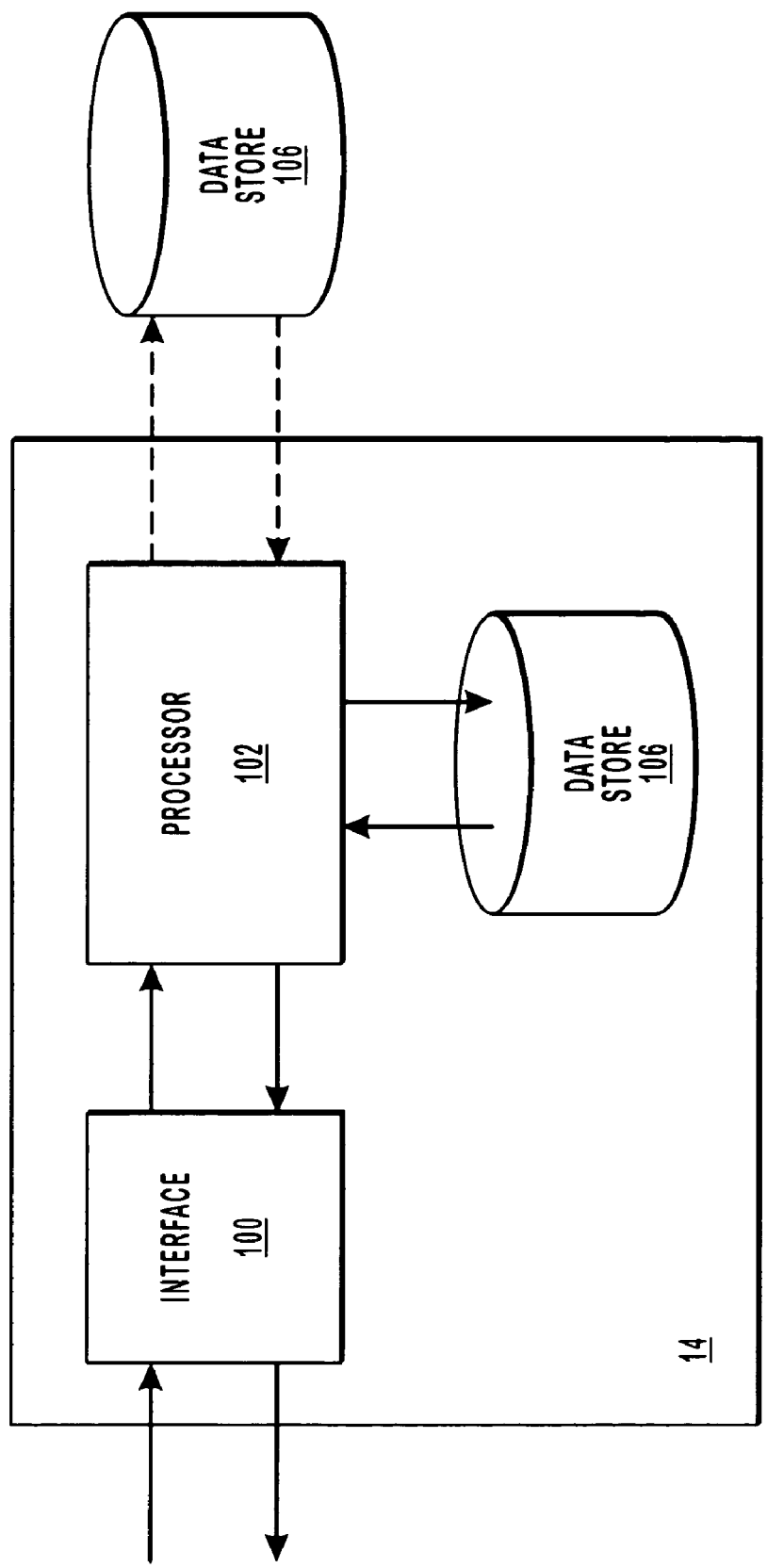
FIG. 6 is a functional block diagram of the data store of the exercise system of FIG. 1.

Referring now to FIG. 6, a schematic representation of telephone answering service 14 is depicted. As illustrated, telephone answering service 14 includes an interface 100, a processor 102 and a data store 104. Interface 100 is configured to receive data from exercise device 12 indicative of selections made by the exerciser using exercise device 12. For example, upon an exerciser depressing a key of keypad 94, exercise device 12 generates a signal representative of such a selection to telephone answering service 14. Interface 100 is configured to receive the same and deliver the signal to processor 102 that identifies the request associated with the representative signal and performs an action associated with the signal. Various configurations of interface 100 are known to one skilled in the art in light of the teaching contained herein. For instance, serial ports, parallel ports, USB ports, wireless ports, or the like.

The processor 102 is configured to analyze the received signal. For instance, in the event that the signal is received in response to a request from telephone answering service 14 for a username and password, processor 102 can analyze the signal and compare the data associated with the signal against data within data store 104 and/or 106 that is associated with the exerciser with the particular username. Similarly, in the event that the signal is received in response to the audio recitation of one or more available menu options, processor 102 can analyze the data carried within the signal to identify the particular option selected. Thereafter, processor 102 can prepare other signals indicative of other menu options available from the particular menu option selected by the exerciser. Alternatively, when the signal is received in response to an audio recitation of available programming, processor 102 can deliver programming requested by the exerciser. Further, processor 102 can analyze user preference data delivered from exercise device 12 to telephone answering service 14 and retrieve an exercise program that matches or substantially matches the user preferences from data store 104 or 106.

As illustrated, telephone answering service 14 can communicate with a data store 106, shown in dotted lines. Such communication can be achieved through a variety of different networks, including but not limited to, a wide area network, a local area network, the Internet, wireless network, conventional telephone lines, or the like. Although reference is made to telephone answering service 14 communicating with data store 106, it can be understood by one skilled in the art that data store 106 is representative of other systems, modules, and devices accessible to telephone answering service 14. For instance, data store 106 can take the form of communication system 18 described in co-pending U.S. patent application Ser. Nos. 09/641,600, 09/641,220, and 09/641,627, the disclosures of which are incorporated herein by reference.

Generally, exercise device 12 and telephone answering service 14 include computer-readable media for carrying or having computer-executable instructions or data structures stored thereon. Illustrative computer-readable media include, but is not limited to, RAM, ROM, EEPROM, CD-ROM, or other optical disk storage, magnetic disk storage, or other magnetic storage devices, or any other medium which may be used to carry or store desired program code means in the form of computer-executable instructions or data structures and which may be accessed by a general-purpose or special-purpose computer. When information, such as one or more signals or programming is transferred or provided between exercise device 12 and telephone answering service 14, telephone 18, output device 20, and telephone answering service 14, telephone 18, and exercise device 12, telephone answering service 14 and data store 106, combinations thereof, or the like, network or another communications connection (either hardwired, wireless, or a combination of hardwired or wireless), such devices properly view the connection as a computer-readable medium. Thus, any such a connection is properly termed a computer-readable medium. Combinations of the above should also be included within the scope of computer-readable media. Computer-executable instructions may include, for example, instructions and data which cause a general-purpose computer, special-purpose computer, or special-purpose processing device to perform a certain function or group of functions, such as delivering data between exercise device 12, telephone answering service 14, telephone 18, output device 20, data store 104, and/or data store 106.

Although reference is made herein to hardware components that are configured to perform certain functions, it can be appreciated by one skilled in the art that one or more functions of exercise device 12, telephone answering service 14, telephone 18, audio output device 20, or data store 106, or any subcomponent thereof, can be performed by computer-executable instructions, such as program modules, that may be executed by exercise device 12, telephone answering service 14, telephone 18, audio output device 20, data store 106, or any subcomponent thereof. Generally, program modules include routines, programs, objects, components, data structures, etc. that perform particular tasks or implement particular abstract data types. Computer-executable instructions, associated data structures, and program modules represent examples of program code means for executing steps of the methods disclosed herein. The particular sequence of such executable instructions or associated data structures represents examples of corresponding acts for implementing the functions described herein.

Figure 7:
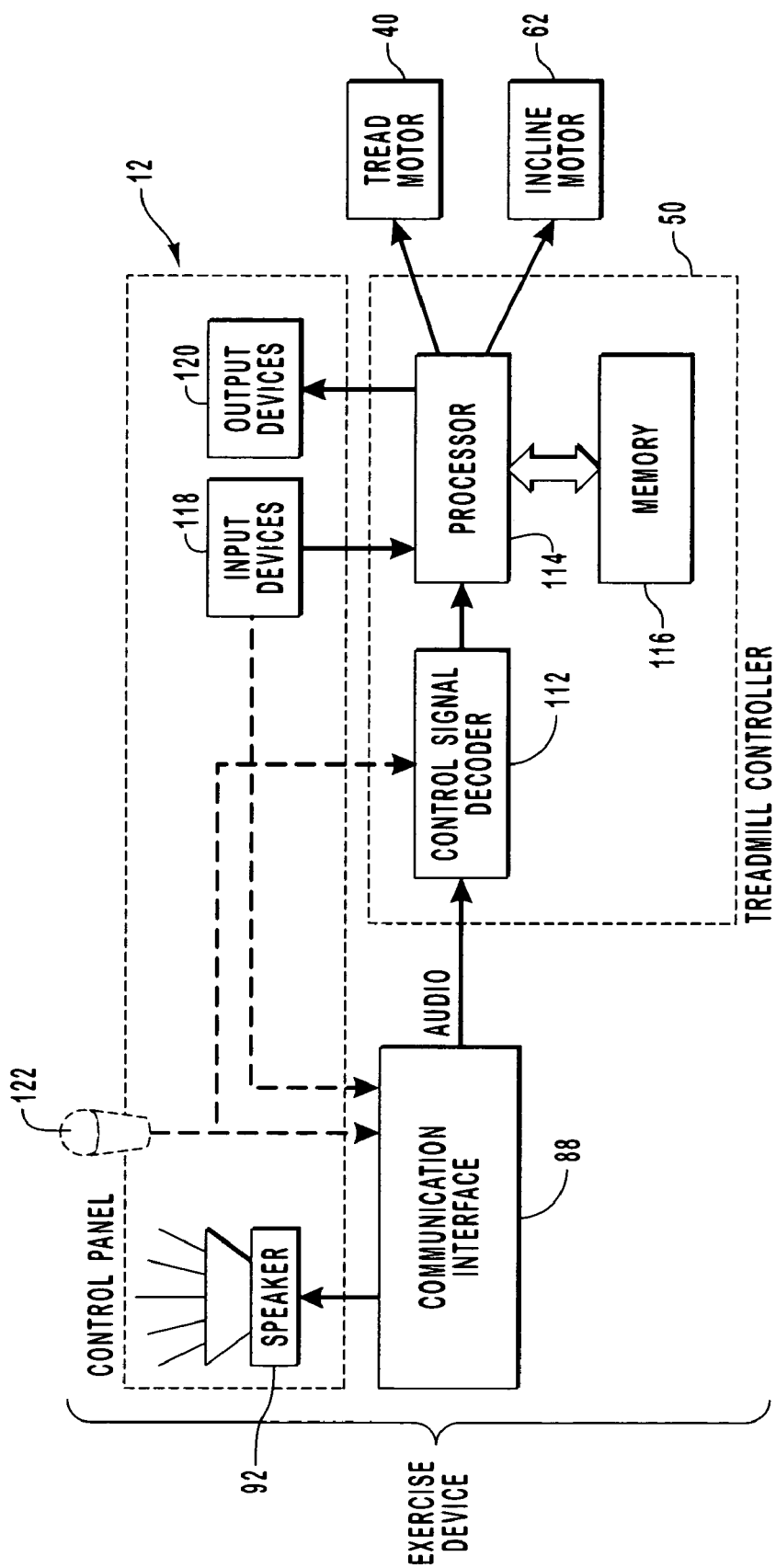
FIG. 7 is a functional block diagram of the reorienting treadmill of the exercise system of FIG. 1.

Reference is now made to FIG. 7, which is a functional block diagram of one embodiment of the present invention. In this embodiment, communication interface 88 receives programming from telephone answering service 14 (FIG. 1). The communication interface 88 is illustrated as being separate from the control panel, however, it can be understood that communication interface 88 can be part of the control panel, the tread base, or any other portion of the exercise device.

The communication interface 88 is coupled directly to speaker 92 and a control signal decoder 112. Optionally, the communication interface 88 is connected directly to an input device 118, such as but not limited to, the keypad or communication connection button through which a user can initiate formation of a connection between the exercise device and the telephone answering service.

Signals received by communication interface 88 are delivered to a signal decoder 112, which decodes the electrical signals to identify one or more control signals that control one or more operating parameters of the exercise device. While signal decoder 112 decodes the electrical signals, speaker 92 presents the programming to the exerciser. Although reference is made to speaker 92 presenting the programming to the exerciser as signal decoder 112 decodes the electrical signals, it can be appreciated by one skilled in the art, that signal decoder 112 can completely decode the programming and store the same in memory before speaker 92 presents the programming to the exerciser.

Generally, decoder circuit 112 detects and identifies properly formatted control signals by checking for the proper 2 kHz carrier frequency signal and checking for errors by comparing the values of the first two bytes against the checksum contained in the third byte. Once decoder circuit 112 confirms that a properly formatted control signal has been received, decoder circuit 112 breaks down the control signal and separates out the speed control portion contained in the first byte from the inclination control portion contained in the second byte. The decoder circuit 112 subsequently passes the appropriate control signals to a processor 114, which in turn adjusts one or more operating parameters of exercise device 12, as dictated by the received control signals. For example, when exercise device 12 is a treadmill, process 114 uses the control signal to adjust the speed of a tread motor 40 and/or position of an incline motor 62. Alternatively, when exercise device 12 is a resistance type device, such as a stationary bicycle, exercise device 12 can adjust a resistance motor that varies the resistance presented to the user.

In addition, processor 114 can store the control signals in a memory 116, such as but not limited to permanent or temporary memory, to allow the user to access the control signals for use for subsequent exercise sessions. Furthermore, memory 116 can store the user preferences generated in response to the answers or questions posed by telephone answering service 14 (FIG. 1).

One skilled in the art can identify various other configurations of the present invention. For example, exercise device 12 can include a microphone 122 that is capable of sensing the control signals delivered from speaker 92. In this manner, control signal decoder 112 and/or processor 114 can compare control signals received from the microphone and communication interface 88 to perform an error checking process before initiating changes in one or more operating parameters of exercise device 12. Alternatively, when exercise device 12 includes microphone 122, control signal decoder 112 can receive the sensed control signals from microphone 122; thereby processing the control signals and changing one or more operating parameters of the exercise device 12. In another configuration, microphone 120 is remote from exercise device 12, while capable of receiving acoustic sound waves produced by speaker 88 and subsequently delivering the one or more control signals to exercise device 12 for comparison with those control signals received directly from communication interface 88. In still another configuration, communication interface 88 is in communication with control signal decoder 112, while speaker 92 is in communication with processor 114 and receives the programming from processor 114 rather than communication interface 88.

Figure 8:
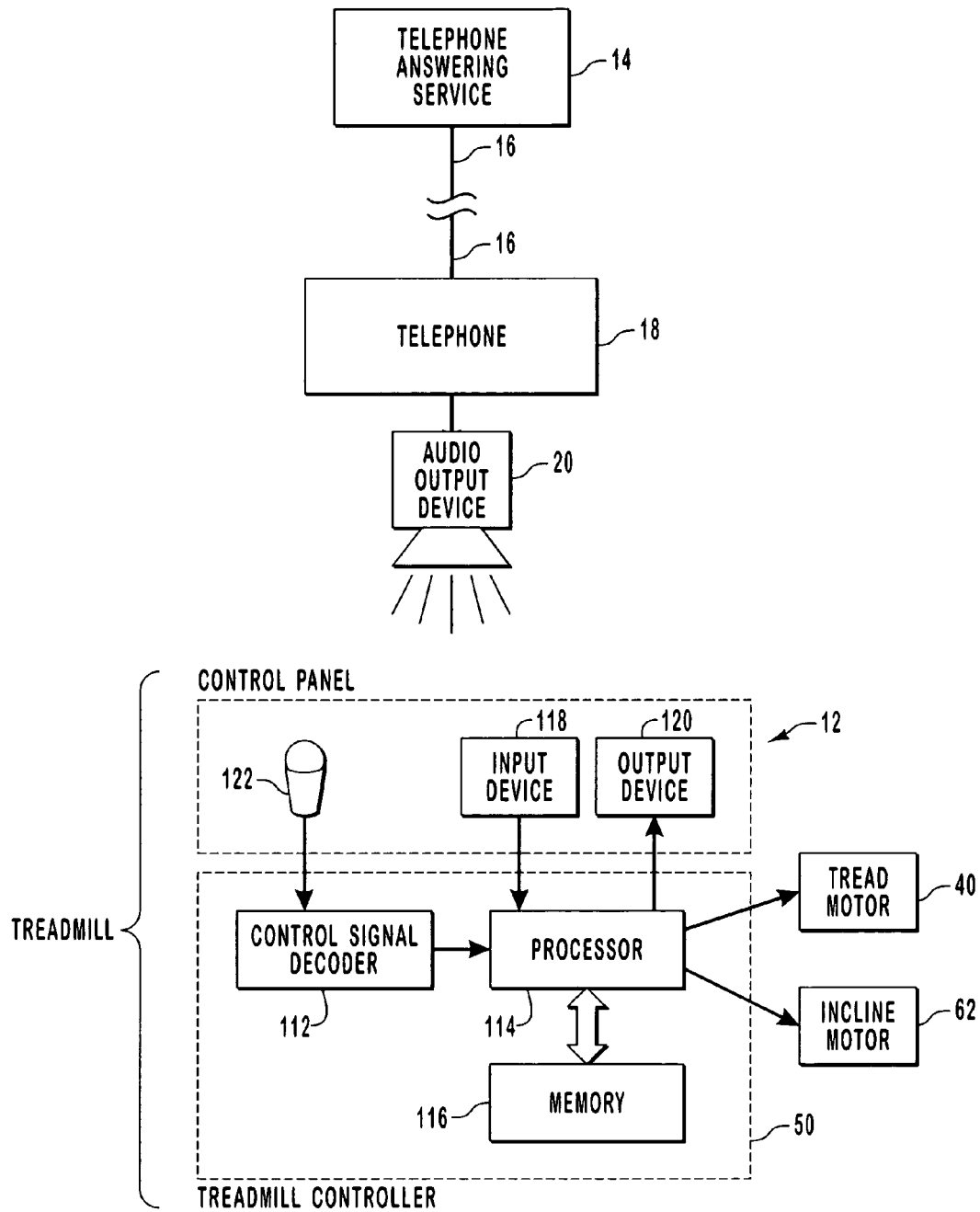
FIG. 8 is a functional block diagram of another embodiment of the exercise system of the present invention.

Referring now to FIG. 8, another alternative configuration of the present invention is depicted. As illustrated, the programming is transmitted from a location remote from the exercise device 12, such as through telephone 18 and associated output device 20. In the embodiment illustrated in FIG. 8, an exerciser accesses telephone answering service 14 through conventional telephone 18. For instance, the exerciser dials the telephone number for telephone answering service 14 to access available programming. Once the exerciser gains access to telephone answering service 14, such as providing the appropriate credentials, and subsequently requests appropriate programming for the exercise device, telephone answering service 14 delivers programming through communication line connection 16.

The telephone 18 delivers the audio signals associated with the programming to output device 20, such as a speaker, which transmits the audio signals indicative of the programming, including the motivational content and/or one or more control signals to exercise device 12. An audio sensor, such as microphone 122, receives the programming.

Microphone 122 receives the reproduced programming in the form of acoustic sound waves produced by output device 20 and converts the received acoustic signals into an electric signal. The output of microphone 120 is received by control signal decoder circuit 112, which decodes the electrical signals to identify the one or more control signals that control one or more operating parameters of treadmill 12.

The decoder circuit 112 detects and identifies properly formatted control signals by checking for the proper 2 kHz carrier frequency signal and checking for errors by comparing the values of the first two bytes against the checksum contained in the third byte. Once decoder circuit 112 confirms that a properly formatted control signal has been received, decoder circuit 112 breaks down the control signal and separates out the speed control portion contained in the first byte from the inclination control portion contained in the second byte. Subsequently, decoder circuit 112 passes the appropriate control signals to a processor 114, which in turn adjusts one or more operating parameters of exercise device 12 and optionally stores the control signals and/or programming in memory 116. For instance, when exercise device 12 is a treadmill, processor 114 adjusts the speed of tread motor 40 and/or the position of inclination motor 62 as dictated by the received control signal.

Figure 9:
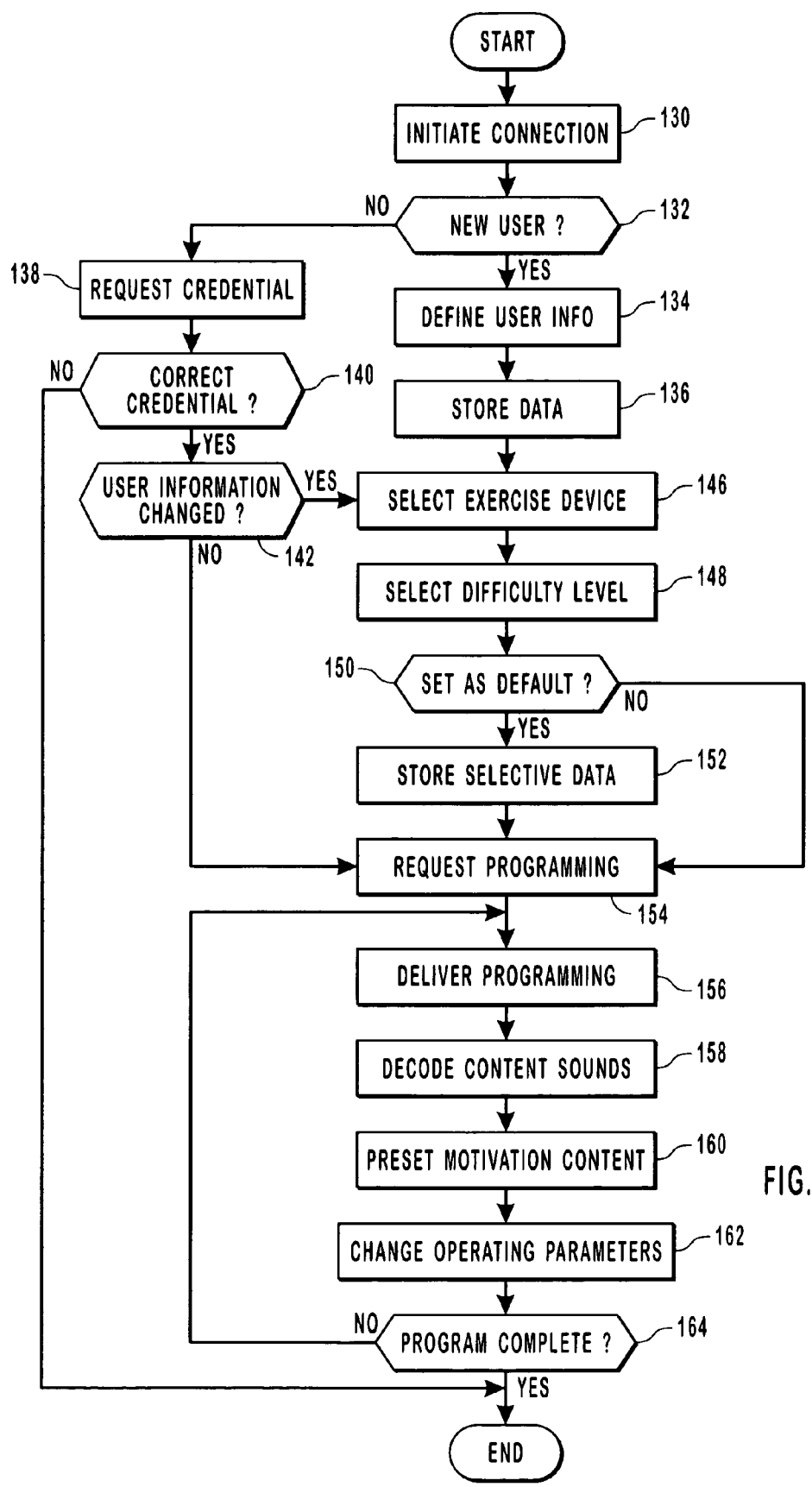
FIG. 9 is a flow chart illustrating one method for controlling an exercise device using one embodiment of the present invention.

FIG. 9 is a flow chart that illustrates one method that may be used with one embodiment of the invention to control exercise device 12 in accordance with programming received by the communication interface. As represented by block 130, a connection is established between the communication interface of the exercise device and the telephone answering service or directly between a telephone integrally formed with the exercise device and the telephone answering service. For instance, this connection is achieved through activating the communication connection button or through depressing one or more keys of the keypad in a prescribed sequence. Upon establishing the connection, the telephone answering service requests whether the user is a new user of the telephone answering service or a current user, as represented by decision block 132. For instance, the telephone answering service presents an audible recitation of "For a new user, press or say 1, for a current user, press or say 2, . . ." Although reference is made to particular numbers to be selected using the keypad, one skilled in the art can appreciate that any number can be associated with any selection available through the telephone answering service. Further, the telephone answering service can select the appropriate action based upon the user providing an audible recitation of the particular selection desired.

In the event that the user is new, the telephone answering service requests various data from the user via the keypad or through audible recitations of the information or data, as represented by block 134. For instance, the telephone answering service may prompt the user for a username, a password, payment information for billing the user for using the functionality associated with the telephone answering service, or the like. This data is subsequently stored by the telephone answering service, as represented by block 136.

When the user is a previous user, the telephone answering service prompts the user for authentication credentials, as represented by block 138. In the event that the credentials are incorrect, as represented by decision block 140 being in the negative, the telephone answering service terminates the connection with the exercise device. Alternatively, when the credential is correct, as represented by decision block 140 being in the affirmative, the telephone answering service prompts the user to select to update the stored data or settings, as represented by decision block 142. For instance, the telephone answering service can recited "To change user information and defaults, press or say 1, to use existing user information and defaults, press or say 2, . . ."

When the user selects to use existing user information and defaults, the telephone answering service accesses default information about the user, the type of exercise device used by the user, the typical exercise difficulty level used by the user, or the like, as represented by block 144. For instance, the telephone answering service can transmit an audio prompt: "Select the exercise device, for treadmills, press or say 1, for stationary bicycles, press or say 2, for ellipticals, press or say 3, for rowing machines, press or say 4, for Nordic ski devices, press or say 5, for steppers, press or say 6, for striding exercise devices, press or say 7, for help press or say 8, to repeat the menu, press or say 9, to return to the main menu, press or say 0, . . ." In response to the selection made by the user, the telephone answering service can transmit further prompts specific to the particular exercise device type selected, such as by prompting: "Select the model of the exercise device; for Model A press or say 1; for Model B press or say 2; for Model C press or say 3, . . ."

Following identifying the particular exercise device that the user is exercising with, the telephone answering service transmits an audio prompt for the user to select the particular difficulty level at which the user wishes to exercise, as represented by block 148. For instance, the prompt may take the form of "Select the difficulty level, for beginner level, press or say 1, for intermediate level, press or say 2, for advanced level, press or say 3, . . ."

Once the user has defined the particular exercise device and the difficulty level at which the user wishes to exercise, the telephone answering service prompts the user to set these selections as defaults, as represented by decision block 150. In the event that the user chooses to set the selections as the user's default information or data, the telephone answering service stores the selections in the data store and associates the information with the user, as represented by block 152. Illustratively, this can be achieved by placing the default data in a file or record associated with the user, linking the default data with a field, file, record, table, or the like associated with the user, generating a table of default data that is stored in one or more data blocks associated with the user, combinations thereof, or other manners known by one skilled in the art.

Following storing the default data or when the user declines to store the default data, as represented by decision block 150 being in the negative, the user is prompted to select from available programming, as represented by block 154. For instance, the audio prompt may be: "You have chosen Model A and an intermediate exercise level, for a cross-country run, press or say 1; for a mountain path run, press or say 2; for a racing track run, press or say 3, for a jogging run, to hear a list of choices at the beginner's level, press or say 8; for the advanced level, press or say 9, . . ." Additionally, either subsequent to or following the selection of the particular type of exercise program, the telephone answering service can prompt the user to select the distance to be traveled, for instance, "For a 1 mile programming, press or say 1, for a 1.5 mile run, press or say 2, for a 2 mile run, press or say 3 . . . " or the like.

Once the exercise program is selected, the telephone answering services retrieves the exercise programming from the data store and delivers the programming to the exercise device, as represented by block 156. As represented by block 158, the one or more control signals associated with the programming are decoded by the exercise. Thereafter, in response to decoding the control signals, the motivational content is presented to the user, as represented by block 160, and one or more operating parameters of the exercise device are changed in accordance with the one or more control signals, as represented by block 162. As represented by decision block 162, the receiving of programming, decoding of control signals, and controlling of the exercise device is continued until the programming is completed.

The present invention enables telephone answering service to deliver all the programming before the exercise device decodes the one or more control signals, presents the motivational content to the user, and changes one or more operating parameters of the exercise device. In another configuration, the telephone answering service delivers the programming in real-time or substantially real-time to the exercise device.

One skilled in the art will recognize the preceding is illustrative only of one possible method or manner by which the telephone answering service prompts the user for information and subsequently delivers requested programming. Further, the preceding is only illustrative of the manner by which the programming is decoded and one or more operating parameters of the exercise device are changed in response to such programming.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of controlling an exercise device through at least one exercise program, the method comprising:
    transmitting a request for at least one exercise program from the exercise device to a telephone answering service, the at least one exercise program comprising at least one control signal for controlling at least one operating parameter of the exercise device;
    receiving at the exercise device the at least one exercise program from the telephone answering service; and
    in response to identifying the at least one control signal of the at least one exercise program, controlling at least one operating parameter of the exercise device in accordance with the at least one control signal.

2. The method as recited in claim 1, further comprising dialing a telephone number associated with the telephone answering service to transmit the request for the at least one exercise program.

3. The method as recited in claim 1, further comprising automatically dialing a telephone number associated with the telephone answering service and automatically receiving the at least one exercise program from the telephone answering service.

4. The method as recited in claim 1, further comprising receiving at the exercise device an audio recitation of a list of available exercise programs stored at the telephone answering service.

5. The method as recited in claim 4, further comprising selecting the at least one exercise program from the list of available exercise programs and delivering data indicative of the selected at least one exercise program to the telephone answering service.

6. The method as recited in claim 1, further comprising presenting the at least one exercise program to a user of the exercise device.

7. The method as recited in claim 6, further comprising capturing the at least one control signal presented to the user.

8. The method as recited in claim 7, wherein upon capturing the at least one control signal presented by the user using a microphone, processing the at least one control signal to control at least one operating parameter of the exercise device in accordance with the at least one control signal.

9. A method of delivering an exercise program to an exercise device, the method comprising:
    receiving a first request for a selected exercise program at a telephone answering service having access to a store of available exercise programs;
    delivering an audio recitation of a list of available exercise programs at the store of available exercise programs to the exercise device; and
    in response to a second request received from the exercise device identifying the selected exercise program, delivering the selected exercise program to the exercise device, the selected exercise program having at least one control signal for controlling at least one operating parameter of the exercise device.

10. The method as recited in claim 9, further comprising dialing a telephone number associated with the telephone answering service to send the first request to the telephone answering service.

11. The method as recited in claim 9, further comprising automatically dialing a telephone number associated with the telephone answering service and automatically delivering the at least one exercise program from the telephone answering service.

12. The method as recited in claim 9, further comprising transmitting to the telephone answering service the second request, the second request including data indicative of the selected exercise program.

13. The method as recited in claim 9, further comprising requesting user specific data from the exercise device, the user specific data comprising data indicative of at least one of a user's identity, a username, a password, payment information, and a type of the exercise device.

14. The method as recited in claim 9, further comprising accessing the store of available exercise programs at a location remote from the telephone answering service.

15. A method of receiving an exercise program to control at least one operating parameter of an exercise device, the method comprising:
    delivering a first request for a selected exercise program to a telephone answering service having a store of available exercise programs;
    upon receiving an audio recitation of a list of available exercise programs at the store of available exercise programs to the exercise device, transmitting a second request for at least one exercise program from the store of available exercise programs; and
    receiving at the exercise device the at least one exercise program from the telephone answering service to control at least one operating parameter of the exercise device in accordance with the at least one exercise program.

16. The method as recited in claim 15, wherein delivering the first request comprises dialing a telephone number associated with the telephone answering service to send the first request to the telephone answering service.

17. The method as recited in claim 16, further comprising dialing the telephone number by way of a keypad integral with the exercise device.

18. The method as recited in claim 15, wherein delivering the first request comprises selecting an input device to automatically dial a telephone number associated with the telephone answering service.

19. The method as recited in claim 18, further comprising selecting a single key of a keypad to automatically dial the telephone number for the telephone answering service.

20. The method as recited in claim 15, wherein transmitting the second request comprises activating one or more keys of a keypad integral with the exercise device to transmit the second request.

\* \* \* \* \*

UNITED STATES PATENT AND TRADEMARK OFFICE
CERTIFICATE OF CORRECTION

PATENT NO. : 7,060,008 B2
APPLICATION NO. : 11/132740
DATED : June 13, 2006
INVENTOR(S) : Watterson et al.

It is certified that error appears in the above-identified patent and that said Letters Patent is hereby corrected as shown below:

Column 4
Line 65, change "indicated" to --indicate--

Column 7
Line 38, change "26" to --36--
Line 58, change "26" to --36--

Column 8
Line 53, after "lines" insert --,--

Column 12
Line 37, change "120" to --122--
Line 39, change "88" to --92--

Column 14
Line 8, change "144" to --154--
Line 62, change "services" to --service--

Column 15
Line 5, change "162" to --164--

Signed and Sealed this

Sixteenth Day of January, 2007

JON W. DUDAS
*Director of the United States Patent and Trademark Office*